United States Patent
Banerjee et al.

(10) Patent No.: US 8,521,933 B2
(45) Date of Patent: Aug. 27, 2013

(54) ROUND ROBIN ARBITER WITH MASK AND RESET MASK

(75) Inventors: Ballori Banerjee, Bangalore (IN); James F. Vomero, Orefiled, PA (US)

(73) Assignee: LSI Corporation, Milpitas, CA (US)

( * ) Notice: Subject to any disclaimer, the term of this patent is extended or adjusted under 35 U.S.C. 154(b) by 386 days.

(21) Appl. No.: 12/982,104

(22) Filed: Dec. 30, 2010

(65) Prior Publication Data
US 2012/0173781 A1  Jul. 5, 2012

(51) Int. Cl.
*G06F 13/00* (2006.01)
(52) U.S. Cl.
USPC .............................. 710/111; 710/40; 710/241
(58) Field of Classification Search
USPC ..................... 710/40, 110–112, 243, 244, 241
See application file for complete search history.

(56) References Cited

U.S. PATENT DOCUMENTS

| | | | | |
|---|---|---|---|---|
| 4,009,470 A * | 2/1977 | Danilenko et al. | ............ | 711/151 |
| 4,473,880 A * | 9/1984 | Budde et al. | ................... | 710/112 |
| 5,053,942 A * | 10/1991 | Srini | .............. | 710/317 |
| 5,168,570 A * | 12/1992 | Eckert et al. | ................... | 710/241 |
| 5,274,785 A * | 12/1993 | Kuddes et al. | ................ | 710/111 |
| 5,392,404 A * | 2/1995 | Thompson | ...................... | 710/40 |
| 5,519,837 A * | 5/1996 | Tran | .............................. | 710/111 |
| 5,832,278 A * | 11/1998 | Pham | ............................ | 710/243 |
| 6,853,218 B1 * | 2/2005 | Reynolds | ......................... | 326/94 |
| 6,954,812 B2 * | 10/2005 | Lavigne | ......................... | 710/243 |
| 6,973,520 B2 * | 12/2005 | Drerup et al. | ................. | 710/110 |
| 7,054,330 B1 | 5/2006 | Chou et al. | | |
| 7,305,507 B2 * | 12/2007 | Lavigne | ......................... | 710/120 |
| 7,739,436 B2 * | 6/2010 | Meyer | ........................... | 710/111 |
| 2004/0210696 A1 * | 10/2004 | Meyer et al. | .................. | 710/240 |
| 2004/0243752 A1 * | 12/2004 | O'Connor et al. | ............ | 710/243 |

OTHER PUBLICATIONS

Thatiparthi et al. Implementation of a Self-Motivated Arbitration Scheme for the Multilayer AHB Busmatrix. IPCSIT vol. 28. 2012.*
Baskirt, Onur. New Logic Architectures for Round Robin Arbitration and Their Automatic RTL Generation. 2008.*
Shin et al. Round-robin Arbiter Design and Generation. ACM. 2002.*

* cited by examiner

*Primary Examiner* — Matthew D Spittle
(74) *Attorney, Agent, or Firm* — Suiter Swantz pc llo

(57) ABSTRACT

In order to provide a solution for performing priority arbitration, a mask and reset-mask are generated in concert with a priority arbitration scheme. A plurality of requestors may issue requests for a shared resource. The priority arbitration scheme may grant access to a single requestor for a single priority assignment period. The mask may assist the priority arbitration scheme to assign priority to the plurality of requestors by temporarily removing a subset of the plurality of requestors for a particular priority assignment period. If the mask allows for no allowable requestors during the priority assignment period, a reset-mask scheme is implemented to reset the mask to permit an increased number of requestors access to the priority arbitration scheme.

17 Claims, 7 Drawing Sheets

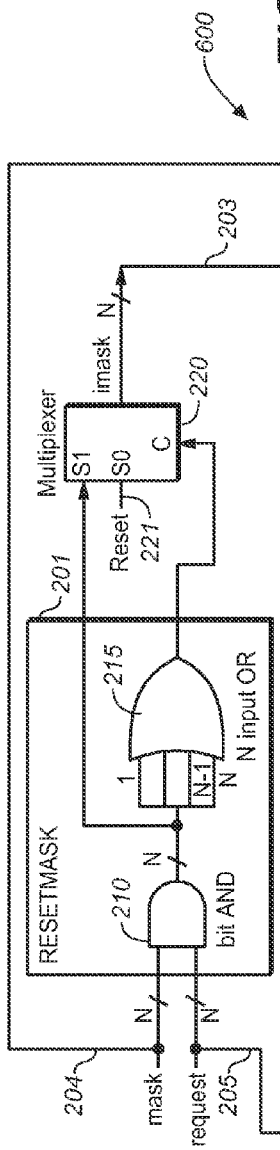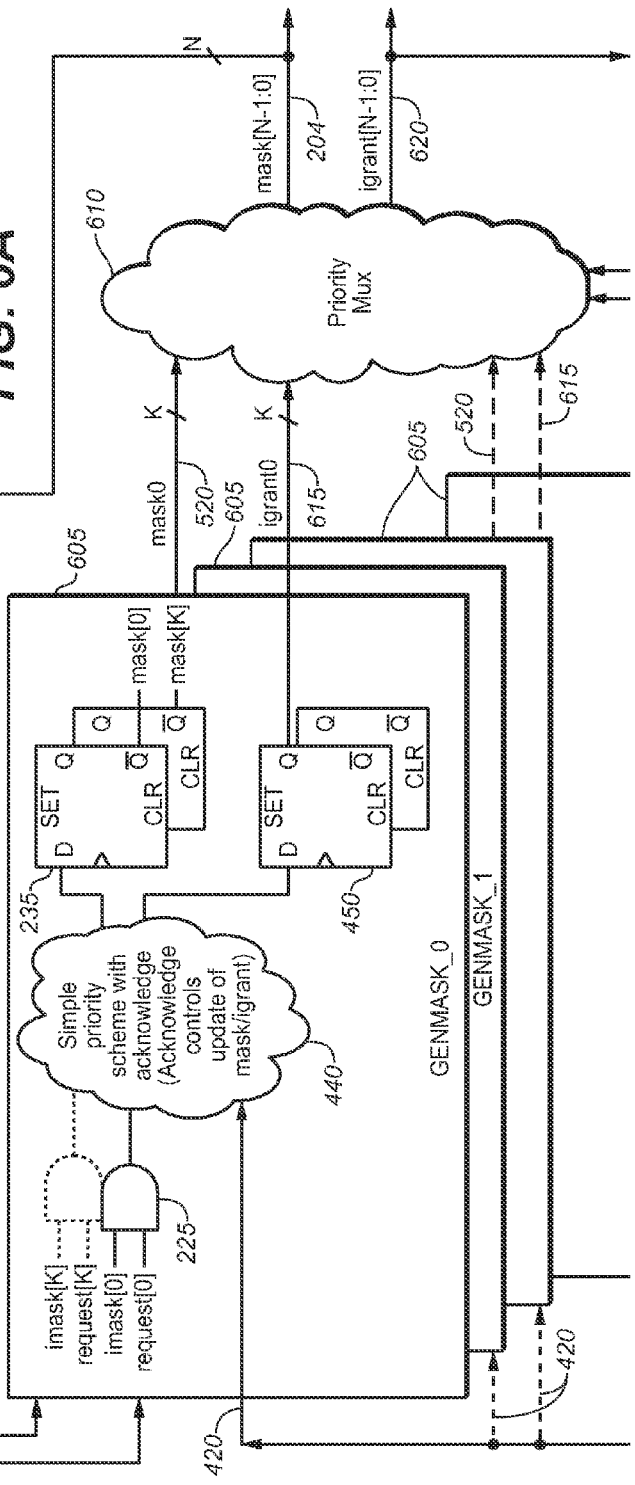

US 8,521,933 B2

ROUND ROBIN ARBITER WITH MASK AND RESET MASK

TECHNICAL FIELD

The present disclosure generally relates to the field of signal processing, and more particularly to devices and systems for performing priority arbitration for a shared resource.

BACKGROUND

In signal processing, there often exists a requirement to share a common resource among a plurality of requestors for the resource. Priority arbitration provides access to the common resource to a single requestor for a period of time. Such priority arbitration attempts to provide reasonable access to the shared resource for each of the plurality of requestors. As the number of requestors increases, the complexity of the priority arbitration system also increases, utilizing valuable area in an integrated circuit.

SUMMARY

A circuit for performing round robin arbitration for a plurality of requestors includes, but is not limited to: a mask reset subcircuit including; N AND gates, each AND gate of the N AND gates associated with one of the N requestors, each AND gate of the N AND gates including: a first input communicatively coupled to receive a mask signal, and a second input communicatively coupled to a request line of one of the N requestors; a N-input OR gate, each input of the OR gate communicatively coupled to an output of an output of one of the N AND gates of the mask reset subcircuit; and a multiplexer for selecting from at least two N-bit inputs to provide a selected output, the selected output including a single bit for each of the N requestors, the multiplexer including: a first multiplexer input, each bit of the first multiplexer input communicatively coupled to an output of the N AND gates of the mask reset subcircuit, a second multiplexer input communicatively coupled to a reset signal, and a control input communicatively coupled to the OR output; and a mask generation subcircuit including; N AND gates, each AND gate of the N AND gates associated with one of the N requestors, each AND gate of the N AND gates including: a first input communicatively coupled to a single bit of the selected output, and a second input communicatively coupled to a request line of one of the N requestors; a priority arbiter subcircuit for providing a grant signal assigning priority to one of the N requestors and the mask signal, the priority arbiter subcircuit coupled to receive an output of the N AND gates of the mask generation subcircuit as an input; and N flip-flops communicatively coupled to the priority arbiter subcircuit for storing the mask signal to provide to the first input, the N flip-flops including a single flip-flop for each of N requestors, each flip-flop included in the N flip-flops including a flip-flop output.

A circuit for performing round robin arbitration for a plurality of requestors includes, but is not limited to: a mask reset subcircuit; a plurality of mask generation subcircuits, each of the plurality of mask generation subcircuits including: N AND gates, each AND gate of the N AND gates associated with one of the N requestors, each AND gate of the N AND gates including: a first input communicatively coupled to a single bit of the selected output, and a second input communicatively coupled to a request line of one of the N requestors; a priority arbiter subcircuit for providing a slice grant signal assigning priority to one of the N requestors and the slice mask signal, the priority arbiter subcircuit coupled to receive an output of the N AND gates of the mask generation subcircuit as an input; and N flip-flops communicatively coupled to the priority arbiter subcircuit for storing the slice mask signal, the N flip-flops including a single flip-flop for each of N requestors, each flip-flop included in the N flip-flops including a flip-flop output; and a mask generation subcircuit arbiter for providing both: a grant signal assigning priority to one of the plurality of requestors based on the slice grant signal from each of the plurality of mask generation subcircuits, and a mask signal to the mask reset subcircuit.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

In order to provide a solution for performing priority arbitration, a mask and reset-mask are generated in concert with a priority arbitration scheme. A plurality of requestors may issue requests for a shared resource. The priority arbitration scheme may grant access to a single requestor for a single priority assignment period. For example, a priority assignment period may be a single clock cycle of the priority arbitration scheme. The mask may assist the priority arbitration scheme to assign priority to the plurality of requestors by temporarily removing a subset of the plurality of requestors for a particular priority assignment period. If the mask allows for no allowable requestors during the priority assignment period, a reset-mask scheme is implemented to reset the mask to permit an increased number of requestors access to the priority arbitration scheme.

Figure 1:
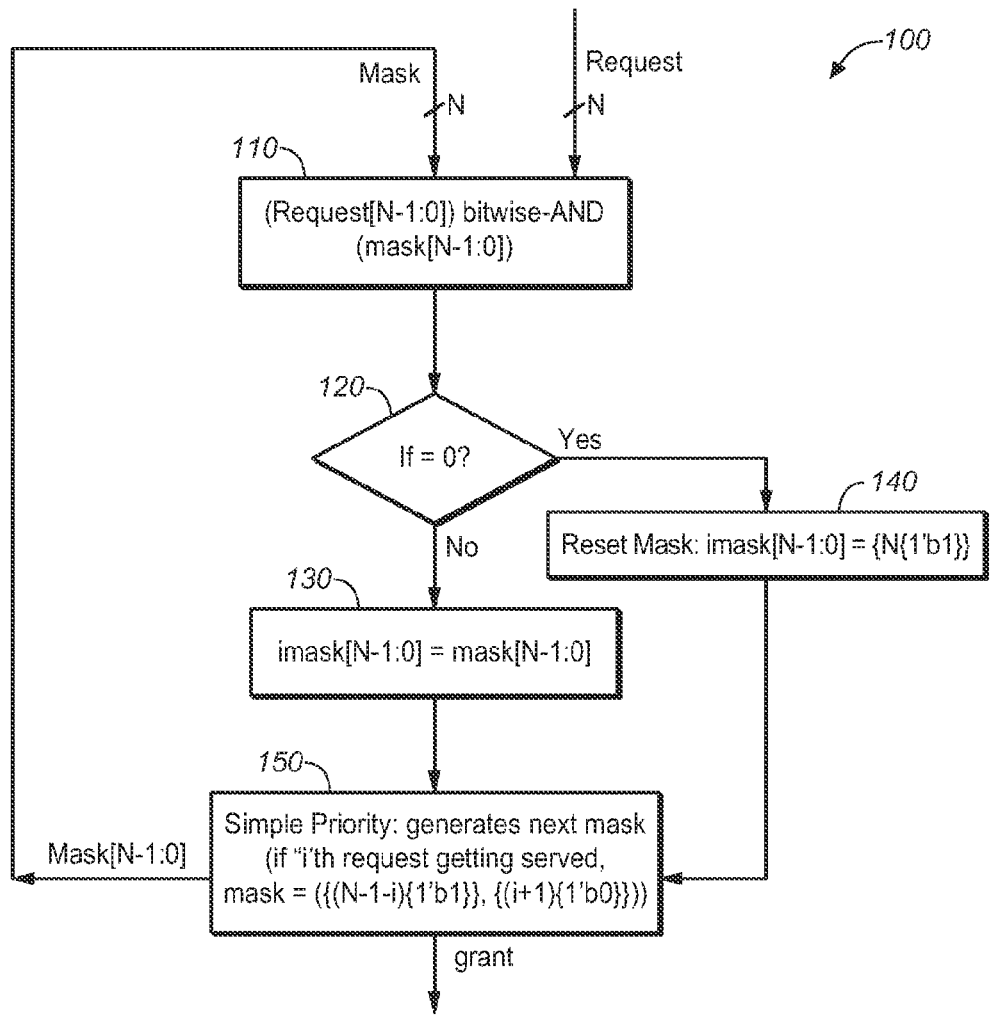
FIG. 1 is a flow diagram illustrating a method for performing priority arbitration for a plurality of requestors.

A flowchart illustrating a method for performing priority arbitration for a plurality of requestors is shown in FIG. 1. Method 100 may include the step 110 representing performing a bitwise AND operation on the mask signal and a request signal representing each of the plurality of requestors. For example, each of N number of requestors may issue a request signal for the shared resource. The mask signal may be a N-bit wide signal. N AND gates may perform the bitwise AND operation on the mask signal and the request signal representing the plurality of requestors.

Method 100 may further include the step 120 representing determining whether there is a request from a requestor that is not masked by the mask signal. Method 100 may proceed to step 120 from step 110. For example, a bit of the mask signal may be set to a logic 0 if the corresponding requestor has been temporarily removed from the current priority assignment period. In addition, a bit of the mask signal may be set to a logic 1 if the corresponding requestor is included in the current priority assignment period. If the result of the bitwise AND operation on the mask signal and the request signal representing the plurality of requestors is a N-bit 0, then there are no requests from a requestor that are not masked by the mask signal. If the result of the bitwise AND operation on the mask signal and the request signal representing the plurality of requestors is not a N-bit 0, then there are requests from a requestor that are not masked by the mask signal. For example, the result of the bitwise AND operation on the mask signal and the request signal representing the plurality of requestors may be the inputs of a N-input logical OR operation. If the output of the logical OR operation is a logic 1, then there are requests from a requestor that are not masked by the mask signal. If the output of the logical OR operation is a logic 0, then there are no requests from a requestor that are not masked by the mask signal.

Method 100 may further include the step 130 representing setting a temporary mask signal to the result of the bitwise AND operation on the mask signal and the request signal representing the plurality of requestors. Method 100 may proceed to set 130 from step 120 upon determining there is a request from a requestor that is not masked by the mask signal. For example, the result of the bitwise AND operation on the mask signal and the request signal representing the plurality of requestors may be a N-bit input to a multiplexer. Further, the control signal of the multiplexer may be the output of the logical OR operation. If the output of the logical OR operation is a logic 1, the multiplexer may be configured to provide the result of the bitwise AND operation on the mask signal and the request signal representing the plurality of requestors as the temporary mask signal.

Method 100 may further include the step 140 representing setting a temporary mask signal to a mask reset value. Method 100 may proceed to set 140 from step 120 upon determining there is no request from a requestor that is not masked by the mask signal. For example, the mask reset value may be a N-bit input to a multiplexer. In one example, the mask reset value may be a N-bit signal with all bits set to a logic 1. Further, the control signal of the multiplexer may be the output of the logical OR operation. If the output of the logical OR operation is a logic 0, the multiplexer may be configured to provide the mask reset value as a temporary mask signal.

Method 100 may further include the step 150 representing generating a mask signal for the next priority assignment period and an access grant signal based on the temporary mask signal. For example, a priority scheme may be applied to the temporary mask signal to generate an access grant signal.

In a round robin priority scheme, the priority scheme may be a simple round robin priority scheme where each of the plurality of requestors is assigned a value (ex—a N-bit request signal representing each of the plurality of requestors). If a request from one of the plurality of requestors is granted access to the shared resource during the current priority assignment period, then the next highest priority requestor from the plurality of requestors (ex—the requestor of the N-bit request signal with the least bit location but also greater bit location than the current requestor) with a request will be granted access to the shared resource during the next priority assignment period. The priority scheme may issue an access grant signal based on the temporary mask signal. For example, the access grant signal may be a N-bit one-hot encoded signal. In another example, the access grant signal may be encoded utilizing less than N bits.

In a round robin priority scheme, the mask signal for the next priority assignment period may be generated based on the requestor granted access during the current priority assignment period. For example, each of the plurality of requestors may be assigned a value (ex—a N-bit request signal representing each of the plurality of requestors). The bit representing the requestor granted access during the current priority assignment period and the bits of each higher priority requestor than the requestor granted access during the current priority assignment period (ex—the requestors of the N-bit request signal with a lesser bit location than the requestor granted access during the current priority assignment period) may be set to a logic 0 in the mask signal for the next priority assignment period. For example, for N requestors, MASK may be a N-bit signal with bit MASK[0] through bit MASK[N−1]. Bit MASK[i] may represent the requestor granted access during the current priority assignment period. Bits MASK[0] through MASK[i] may be set to a logic 0 for the next priority assignment period. The bits representing the next requestors (ex—the requestors of the N-bit request signal with a greater bit location than the requestor granted access during the current priority assignment period) may be set to a logic 1 in the mask signal for the next priority assignment period. Using the previous example, bits MASK[i+1] through MASK[N−1] may be set to a logic 1 for the next priority assignment period. Other priority schemes may be applied to create a mask signal and reset mask signal.

Method 100 may proceed to step 110 from step 150 utilizing the mask signal for the next priority assignment period generated in step 150.

Figure 2:
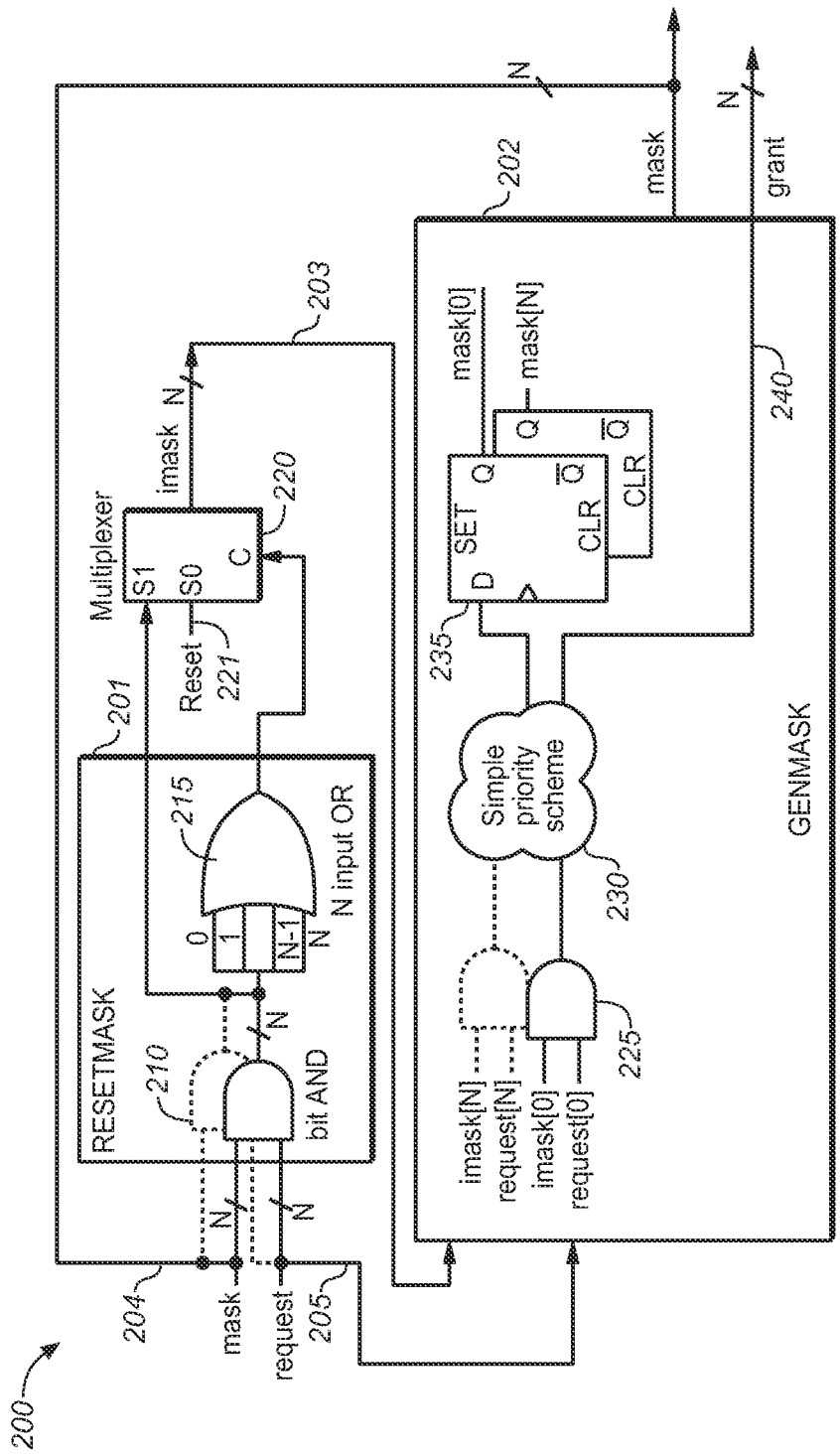
FIG. 2 is a block diagram illustrating signal processing circuitry for performing priority arbitration for a plurality of requestors.

A circuit diagram representing an architecture for performing priority arbitration for a plurality of requestors is shown in FIG. 2. Architecture 200 may be configured to perform method 100 of FIG. 1. Architecture 200 may include a mask reset module 201 for setting a temporary mask signal 203. Mask reset module 201 may include a plurality of AND gates 210. Plurality of AND gates 210 may include a single AND gate for each of the plurality of requestors. For example, if there are N requestors, then plurality of AND gates 210 may include N AND gates. Each of plurality of AND gates 210 may perform a bitwise AND operation on the mask signal 204 and a request signal 205. Mask signal 204 and request signal 205 may include a single bit for each of the plurality of requestors. Request signal 205 may represent a signal issued by each of plurality of requestors (ex—set to logic 1 if access to the shared resource is requested, set to logic 0 if access is not requested). For example, if there are N requestors, then mask signal 204 and request signal 205 may each be N-bit signals. The output of plurality of AND gates 210 may represent the requestors of the plurality of requestors included in the current priority assignment period via the mask signal 204 with a current request.

Mask reset module 201 may further include an OR gate 215 for performing a bitwise OR operation. OR gate 215 may accept the output of plurality of AND gates 210 as input signals. OR gate 215 may include a single input for each of plurality of AND gates 210. For example, if there are N AND gates, then OR gates 215 may include N inputs. The output of OR gate 215 may represent whether there are any requestors of the plurality of requestors included in the current priority assignment period with a current request.

Architecture 200 may further include multiplexer 220. Multiplexer 220 may be configured to select from two N-bit inputs to provide a temporary mask signal 203. A first input of multiplexer 220 may be communicatively coupled to mask reset signal 221. A second input of multiplexer 220 may be communicatively coupled to the output of plurality of AND gates 210. A control signal input of multiplexer 220 may be communicatively coupled to the output of OR gate 215. Multiplexer 220 may be configured to select and provide the mask reset value 221 as a temporary mask signal 203 if the control signal input of multiplexer 220 is a logic 0. Multiplexer 220 may be configured to select and provide the output of plurality of AND gates 210 as a temporary mask signal 203 if the control signal input of multiplexer 220 is a logic 1.

Architecture 200 may further include mask generation module 202. Mask generation module 202 may include plurality of AND gates 225. Plurality of AND gates 225 may include a single AND gate for each of the plurality of requestors. For example, if there are N requestors, then plurality of AND gates 225 may include N AND gates. Plurality of AND gates 225 may perform a bitwise AND operation on the request signal 205 and temporary mask signal 203.

Mask generation module 202 may further include priority scheme module 230. Priority scheme module 230 may receive the output of plurality of AND gates 225 as input. Priority scheme module 230 may issue an access grant signal 240. For example, the access grant signal 240 may include a one-hot encoded signal indicating access for one of the plurality of requestors. The one-hot encoded signal may include a single bit for each of the plurality of requestors. For example, if there are N requestors, then the one-hot encoded signal may include a N-bit signal. In another example, the access grant signal 240 may include other signal encodings.

In a round robin priority scheme, the priority scheme may be a simple round robin priority scheme where each of the plurality of requestors is assigned a value (ex—a N-bit request signal representing each of the plurality of requestors). If a request from one of the plurality of requestors is granted access to the shared resource during the current priority assignment period, then the next highest priority requestor from the plurality of requestors (ex—the requestor of the N-bit request signal with the least bit location but also greater bit location than the current requestor) with a request will be granted access to the shared resource during the next priority assignment period. For example, for N requestors, output[0] through output[N−1] may represent the output signal of plurality of AND gates 225. Each of output[0] through output[N−1] may represent a single requestor. In this scheme, output[x−1] has a higher priority than output[x] and output[x] has a higher priority than output[x+1]. In this scheme, the requestor corresponding to the bit of output[0] through output[N−1] with the highest priority that is also set to a logic 1 will be granted access. The priority scheme may issue an access grant signal based on the temporary mask signal. The access grant signal may represent the requestor granted access. For example, the access grant signal may be a N-bit one-hot encoded signal. In another example, the access grant signal may be encoded utilizing less than N bits.

Priority scheme module 230 may issue mask signal 204 to a plurality of flip-flops 235 for temporarily storing mask signal 204 for the next clock cycle. Plurality of flip-flops may receive a clock signal as input for triggering the output of mask signal 204. For example, for N requestors, mask signal 204 may be represented by MASK. MASK may be a N-bit signal with bit MASK[0] through bit MASK[N−1]. Bit MASK[i] may represent the requestor granted access during the current priority assignment period. Bits MASK[0] through MASK[i] may be set to a logic 0 for the next priority assignment period. The bits representing the next requestors (ex—the requestors of the N-bit request signal with a greater bit location than the requestor granted access during the current priority assignment period) may be set to a logic 1 in the mask signal for the next priority assignment period. Using the previous example, bits MASK[i+1] through MASK[N−1] may be set to a logic 1 for the next priority assignment period.

Figure 3:
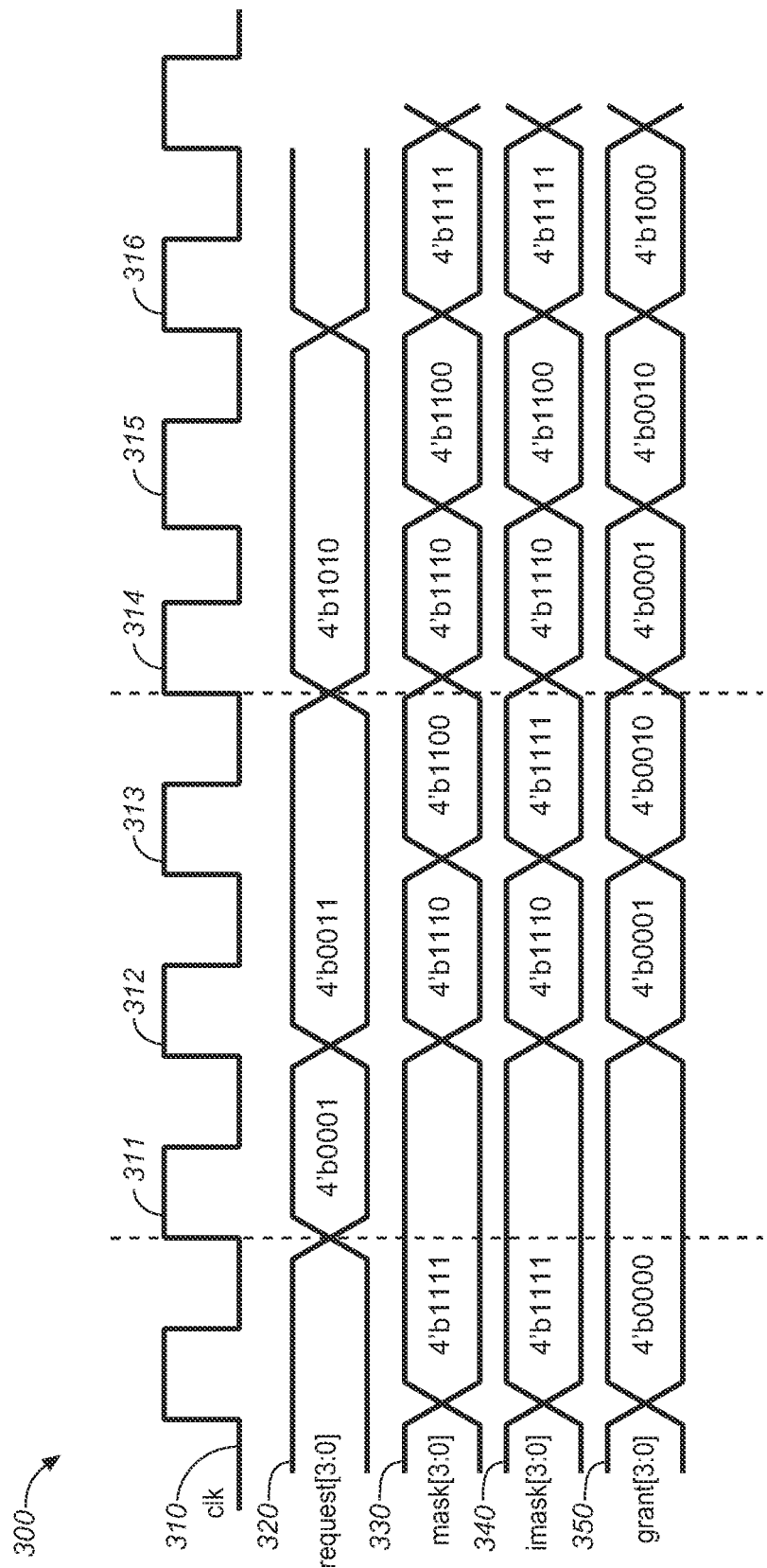
FIG. 3 is a waveform timing diagram illustrating several waveforms of the circuitry of FIG. 2.

A simplified timing diagram for a system performing a priority arbitration for 4 requestors is shown in FIG. 3. In an example, architecture 200 may produce timing diagram 300. Timing diagram 300 may include a clock signal 310. Timing diagram 300 may include a request signal 320 representing a 4-bit version of request signal 205. Request signal 320 may represent request signals of 4 requestors, where the request signal 320 is encoded as {fourth requestor, third requestor, second requestor, first requestor}. Timing diagram 300 may include a mask signal 330 representing a 4-bit version of mask signal 204. Timing diagram 300 may include an imask signal 340 representing a 4-bit version of temporary mask signal 203. Timing diagram 300 may include a grant signal 350 representing a 4-bit one-hot encoded version of access grant signal 240.

As timing diagram 300 begins, mask signal 330 and imask signal 340 are both set to 4'b1111. Grant signal 350 is set to 4'b0000. During clock cycle 311, the first requestor issues a request to change request signal 320 to 4'b0001. During the next clock cycle 312, imask signal 340 is changed to 4'b1110 via mask reset module 201 and mask signal 330 is changed to 4'b1110 via mask generation module 202. Access is granted to the first requestor as grant signal 350 is changed to 4'b0001 via mask generation module 202. Also during clock cycle 312, both the first requestor and the second requestor issue requests to change request signal 320 to 4'b0011.

During the next clock cycle 313, imask signal 340 is changed to 4'b1111 as the reset signal is selected by multiplexer 220. Mask signal 330 is changed to 4'b1100 via mask generation module 202. Access is granted to the second requestor as grant signal 250 is changed to 4'b0010 due to the first requestor being masked.

During the next clock cycle 314, the second requestor and the fourth request issue requests to change request signal 320 to 4'b1010. Mask signal 330 is changed to 4'b1110 via mask generation module and imask signal 340 is changed to 4'b1110 via mask reset module 201. Access is granted to the first requestor for the request issued in cycles 312 through 313 as grant signal 350 is changed to 4'b0001.

During the next clock cycle 315, imask signal 340 is changed to 4'b1100 via mask reset module 201. Mask signal 330 is changed to 4'b1100 via mask generation module 202. Access is granted to the second requestor as grant signal 250 is changed to 4'b0010.

During the next clock cycle 316, imask signal 340 is changed to 4'b1111 via mask reset module 201. Mask signal 330 is changed to 4'b1111 via mask generation module 202. Access is granted to the fourth requestor as grant signal 250 is changed to 4'b1000 due to the second requestor being masked.

A sample verilog code for implementing the mask signal 330 (mask[3:0]), the imask signal 340 (imask[3:0]), and the request signal 320 (req[3:0]) for 4 requestors is provided below.

```
always @(posedge clk) begin
  casex(req[3:0] & imask[3:0])
    4'b0000 : ;
    4'bxxx1 : mask <= 4'b1110;
    4'bxx10: mask <= 4'b1100;
    4'bx100: mask <= 4'b1000;
    4'b1000: mask <= 4'b1111;
    default : ;
  endcase
always @(*) begin
  if (~| (mask[3:0] & req[3:0]))
    imask =4'b1111; //reset mask
  else
    imask = mask;
  end
```

Figure 4:
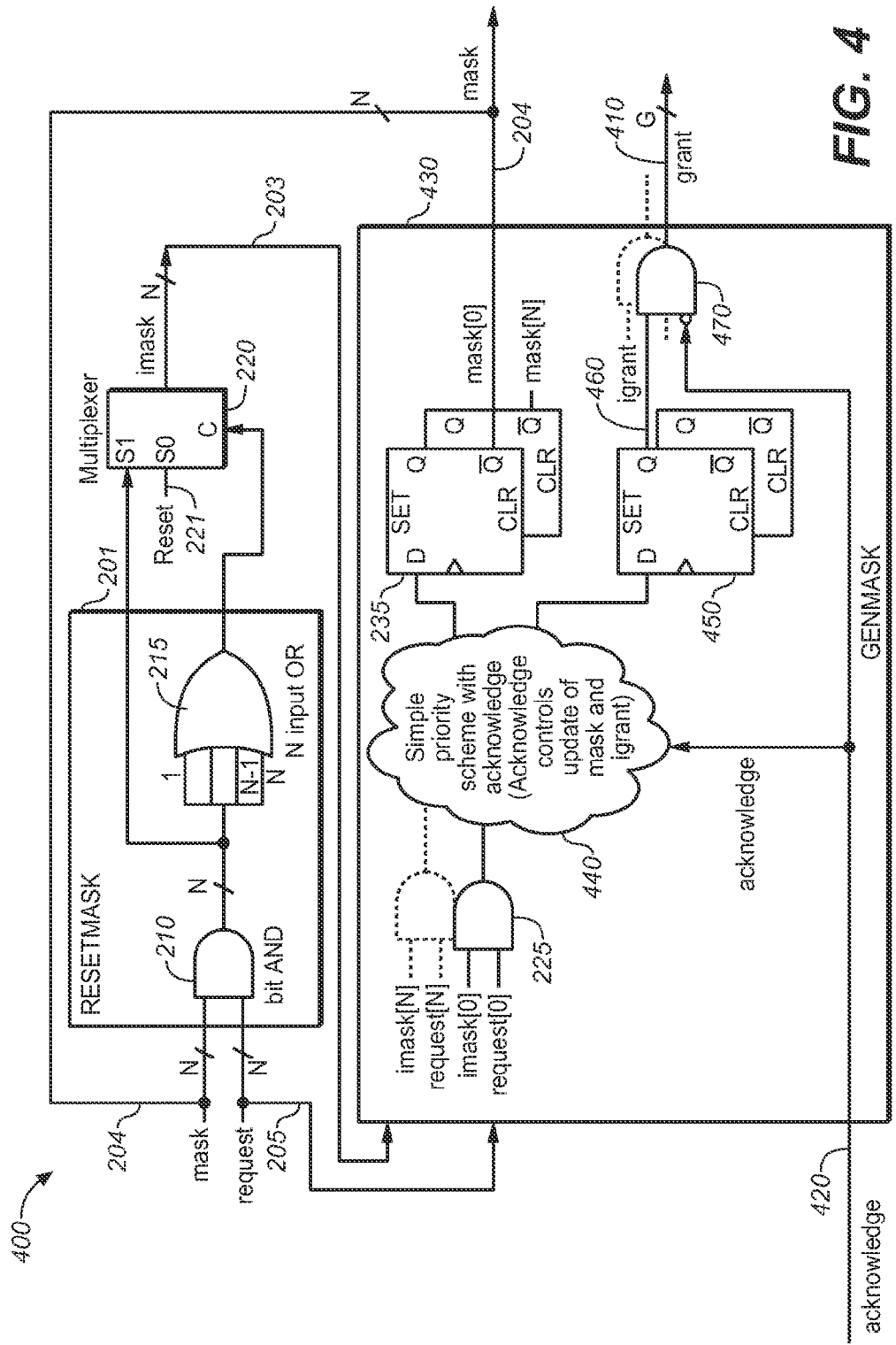
FIG. 4 is a block diagram illustrating signal processing circuitry for performing priority arbitration for a plurality of requestors with an acknowledge signal.

A circuit diagram representing an architecture for performing priority arbitration for a plurality of requestors with an acknowledge signal is shown in FIG. 4. For example, the grant signal 410 of architecture 400 may be provided to a queue (ex—a first in, first out (FIFO) data structure) for temporary storage prior to utilization for granting access to the shared resource. In this example, a signal indicating that the queue is full and is unable to temporarily store additional grant signals may be considered an acknowledge signal 420.

Architecture 400 may include a mask reset module 201 for setting a temporary mask signal 203. Mask reset module 201 may include a plurality of AND gates 210. Plurality of AND gates 210 may include a single AND gate for each of the plurality of requestors. For example, if there are N requestors, than plurality of AND gates 210 may include N AND gates. Each of plurality of AND gates 210 may perform a bitwise AND operation on the mask signal 204 and a request signal 205. Mask signal 204 and request signal 205 may include a single bit for each of the plurality of requestors. Request signal 205 may represent a signal issued by each of plurality of requestors (ex—set to logic 1 if access to the shared resource is requested, set to logic 0 if access is not requested). For example, if there are N requestors, than mask signal 204 and request signal 205 may each be N-bit signals. The output of plurality of AND gates 210 may represent the requestors of the plurality of requestors included in the current priority assignment period via the mask signal 204 with a current request.

Mask reset module 201 may further include an OR gate 215 for performing a bitwise OR operation. OR gate 215 may accept the output of plurality of AND gates 210 as input signals. OR gate 215 may include a single input for each of plurality of AND gates 210. For example, if there are N AND gates, then OR gates 215 may include N inputs. The output of OR gate 215 may represent whether there are any requestors of the plurality of requestors included in the current priority assignment period with a current request.

Architecture 400 may further include multiplexer 220. Multiplexer 220 may be configured to select from two N-bit inputs to provide a temporary mask signal 203. A first input of multiplexer 220 may be communicatively coupled to mask reset signal 221. A second input of multiplexer 220 may be communicatively coupled to the output of plurality of AND gates 210. A control signal input of multiplexer 220 may be communicatively coupled to the output of OR gate 215. Multiplexer 220 may be configured to select and provide the mask reset value 221 as a temporary mask signal 203 if the control signal input of multiplexer 220 is a logic 0. Multiplexer 220 may be configured to select and provide the output of plurality of AND gates 210 as a temporary mask signal 203 if the control signal input of multiplexer 220 is a logic 1.

Architecture 400 may further include mask generation module 430. Mask generation module 430 may include plurality of AND gates 225. Plurality of AND gates 225 may include a single AND gate for each of the plurality of requestors. For example, if there are N requestors, then plurality of AND gates 225 may include N AND gates. Plurality of AND gates 225 may perform a bitwise AND operation on the request signal 205 and temporary mask signal 203.

Mask generation module 430 may further include priority scheme module 440. Priority scheme module 440 may receive the output of plurality of AND gates 225 and acknowledge signal 420 as input. Priority scheme module 440 may issue an access grant temporary signal 460. Access grant temporary signal 460 remains unchanged while acknowledge signal 420 is asserted (ex—set to logic 1). Mask generation module 430 may further include a plurality of flip-flops 450 communicatively coupled to priority scheme module 440 for receiving and storing access grant temporary signal 460. Plurality of flip-flops 450 may include a single flip-flop for each of the bits of access grant temporary signal 460. For example, the access grant temporary signal 460 may include a one-hot encoded signal indicating access for one of the plurality of requestors. The one-hot encoded signal may include a single bit for each of the plurality of requestors. For example, if there are N requestors, then the one-hot encoded signal may include a N-bit signal. In another example, the access grant temporary signal 460 may include other signal encodings.

Priority scheme module 440 may issue mask signal 204 to a plurality of flip-flops 235 for temporarily storing mask signal 204 for the next clock cycle. Plurality of flip-flops 235 may receive a clock signal as input for triggering the output of mask signal 204. For example, for N requestors, mask signal 204 may be represented by MASK. MASK may be a N-bit signal with bit MASK[0] through bit MASK[N−1]. Bit MASK[i] may represent the requestor granted access during the current priority assignment period. Bits MASK[0] through MASK[i] may be set to a logic 0 for the next priority assignment period. The bits representing the next requestors (ex—the requestors of the N-bit request signal with a greater bit location than the requestor granted access during the current priority assignment period) may be set to a logic 1 in the mask signal for the next priority assignment period. Using the previous example, bits MASK[i+1] through MASK[N−1] may be set to a logic 1 for the next priority assignment period.

Plurality of flip-flops 450 may include a clock signal for triggering the output of access grant temporary signal 460 to a plurality of AND gates with an inverted input 470. Plurality of AND gates with an inverted input 470 may perform a bitwise AND operation on access grant temporary signal 460 and the acknowledge signal 420 to provide access grant signal 410. Plurality of AND gates 470 may provide a non-zero access grant signal 410 when acknowledge signal 420 is not asserted (ex—set to logic 0). Priority scheme module 440 may also be configured to maintain a current mask signal 204 while acknowledge signal 420 is asserted (ex—set to logic 1). Thus, when acknowledge signal 420 changes from asserted to de-asserted (ex—changes from logic 1 to logic 0), mask signal 204 will be updated in the next clock cycle.

A sample verilog code for implementing the mask signal 204 (mask[3:0]), the temporary mask signal 203 (imask[3:0]), acknowledge signal 420 (acknowledge), access grant temporary signal 460 (igrant[3:0]), access grant signal 410 (grant), and the request signal 205 (req[3:0]) for 4 requestors is provided below.

```
always @(posedge clk) begin
    if (acknowledge) begin //if acknowledge is high
            //maintain signal values
        mask<=mask;
        igrant <=igrant;
    end
    else begin
        casex(req[3:0] & imask[3:0])
        4'b0000 : ;
        4'bxxx1 : begin
        mask <= 4'b1110;
        igrant <=4'b0001;
        end
        4'bxx10: begin
        mask <= 4'b1100;
        igrant <=4'b0010;
        end
        4'bx100:begin
        mask <= 4'b1000;
        igrant <=4'b0100;
        end
        4'b1000:begin
        mask <= 4'b1111;
        igrant <= 4'b1000;
        end
        default : ;
        endcase
    end
end
always @(*) begin
    if (~| (mask[3:0] & req[3:0]))
    imask =4'b1111; //reset mask
    else
    imask = mask;
end
assign grant = acknowledge ?4'b0000 : igrant; //gate grant with
acknowledge
```

Figure 5:
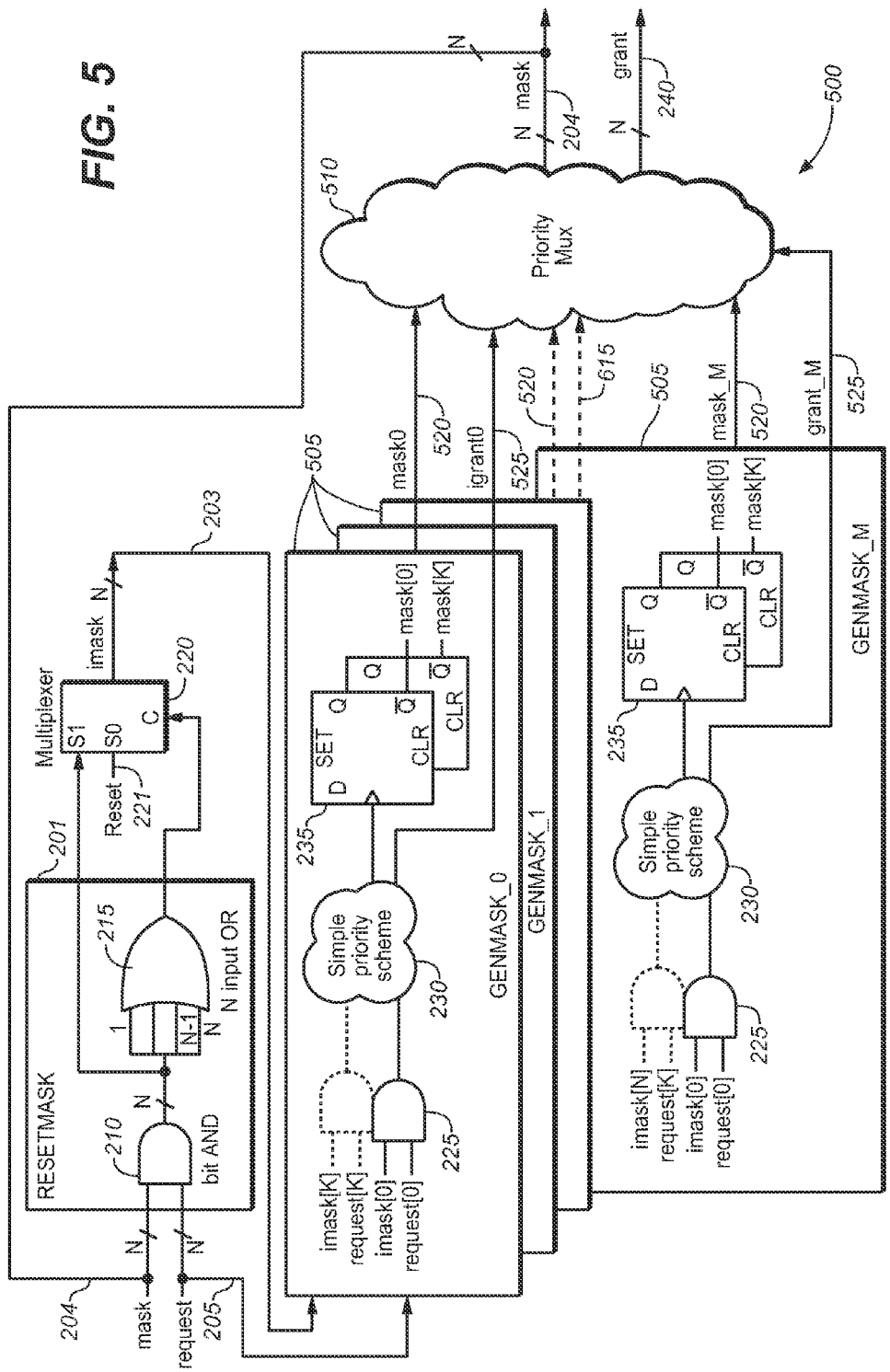
FIG. 5 is a block diagram illustrating signal processing circuitry for performing priority arbitration for a plurality of requestor slices.

A circuit diagram representing an architecture for performing priority arbitration for a plurality of requestor slices is shown in FIG. 5. For example, as the number of requestors for the shared resource increases, the amount of time priority scheme module 230 utilizes to issue mask signal 204 and access grant signal 240 also increases. In order to provide timing closure for architecture 500, a plurality of mask generation modules 505 (ex—mask generation module 202) may each operate on a subset of the requestors, and an additional priority arbiter module 510 arbitrates between the output of the plurality of mask generation modules 505. For example, N requestors of a shared resource may be divided into M slices each operating K requestors.

Architecture 500 may include a mask reset module 201 for setting a temporary mask signal 203. Mask reset module 201 may include a plurality of AND gates 210. Plurality of AND gates 210 may include a single AND gate for each of the plurality of requestors. For example, if there are N requestors, than plurality of AND gates 210 may include N AND gates. Each of plurality of AND gates 210 may perform a bitwise AND operation on the mask signal 204 and a request signal 205. Mask signal 204 and request signal 205 may include a single bit for each of the plurality of requestors. Request signal 205 may represent a signal issued by each of plurality of requestors (ex—set to logic 1 if access to the shared resource is requested, set to logic 0 if access is not requested). For example, if there are N requestors, than mask signal 204 and request signal 205 may each be N-bit signals. The output of plurality of AND gates 210 may represent the requestors of the plurality of requestors included in the current priority assignment period via the mask signal 204 with a current request.

Mask reset module 201 may further include an OR gate 215 for performing a bitwise OR operation. OR gate 215 may accept the output of plurality of AND gates 210 as input signals. OR gate 215 may include a single input for each of plurality of AND gates 210. For example, if there are N AND gates, then OR gates 215 may include N inputs. The output of OR gate 215 may represent whether there are any requestors of the plurality of requestors included in the current priority assignment period with a current request.

Architecture 500 may further include multiplexer 220. Multiplexer 220 may be configured to select from two N-bit inputs to provide a temporary mask signal 203. A first input of multiplexer 220 may be communicatively coupled to mask reset signal 221. A second input of multiplexer 220 may be communicatively coupled to the output of plurality of AND gates 210. A control signal input of multiplexer 220 may be communicatively coupled to the output of OR gate 215. Multiplexer 220 may be configured to select and provide the mask reset value 221 as a temporary mask signal 203 if the control signal input of multiplexer 220 is a logic 0. Multiplexer 220 may be configured to select and provide the output of plurality of AND gates 210 as a temporary mask signal 203 if the control signal input of multiplexer 220 is a logic 1.

Architecture 500 may further include plurality of mask generation modules 505 (ex—mask generation module 202). For example, if N requestors of a shared resource may be divided into M slices each operating K requestors, then plurality of mask generation modules may include M mask generation modules. Each of mask generation modules 505 may include plurality of AND gates 225. Plurality of AND gates 225 may include a single AND gate for each of the subset of the plurality of requestors handled by that particular mask generation module. For example, if there are K requestors operated on by a single mask generation module, then plurality of AND gates 225 may include K AND gates. Plurality of AND gates 225 may perform a bitwise AND operation on the request signal 205 and temporary mask signal 203.

Each of plurality of mask generation modules 505 may further include priority scheme module 230. Priority scheme module 230 may receive the output of plurality of AND gates 225 as input. Priority scheme module 230 may issue a slice access grant signal 525. For example, the slice access grant signal 525 may include a one-hot encoded signal indicating access for one of the plurality of requestors. The one-hot encoded signal may include a single bit for each of the plurality of requestors handled by the mask generation module. For example, if there are K requestors, then the one-hot encoded signal may include a K-bit signal. In another example, the slice access grant signal 240 may include other signal encodings.

Priority scheme module 230 may issue slice mask signal 520 to a plurality of flip-flops 235 for temporarily storing slice mask signal 520 for the next clock cycle. Plurality of flip-flops may receive a clock signal as input for triggering the output of slice mask signal 520. For example, for K requestors, slice mask signal 520 may be represented by MASK. MASK may be a K-bit signal with bit MASK[0] through bit MASK[K-1]. Bit MASK[i] may represent the requestor granted access during the current priority assignment period. Bits MASK[0] through MASK[i] may be set to a logic 0 for the next priority assignment period. The bits representing the next requestors (ex—the requestors of the K-bit request signal with a greater bit location than the requestor granted access during the current priority assignment period) may be set to a logic 1 in the mask signal for the next priority assignment period. Using the previous example, bits MASK[i+1] through MASK[K-1] may be set to a logic 1 for the next priority assignment period.

Each of mask generation modules 505 may issue a slice access grant signal 525 and a slice mask signal 520 to priority arbiter module 510. Priority arbiter module 510 may operate on each slice access grant signal 525 and each slice mask signal 520 to provide a mask signal 204 and an access grant signal 240.

A sample verilog code for implementing priority arbiter module 510 for 128 requestors, where the 128 requestors are divided among 4 mask generation modules, each mask generation module handling 32 requestors is provided below.

```
assign req_active = request[127:0] & imask[127:0];
assign req_active0 = |req_active[31:0];
assign req_active1 = |req_active[63:32];
assign req_active2 = |req_active[95:64];
assign req_active3 = |req_active[127:96];
always@(*) begin
    casex ({req_active3,req_active2,req_active1,req_active0})
        4'bxxx1:begin
            mask ={{96{1'b1}},mask0[31:0]};
            grant = grant0;
        end
        4'bxx10 :begin
            mask ={{64{1'b1}},mask1[31:0],32'h0};
            grant = grant1;
        end
        4'bx100 : begin
            mask ={{32{1'b1}},mask2[31:0],64'h0};
            grant = grant2;
        end
        4'b1000 : begin
            mask ={mask3[31:0],96'h0};
            grant = grant3;
        end
        4'b0000 : begin
            mask = 128'h0
            grant = 0 //none
        end
    endcase
end
```

Figure 6B:
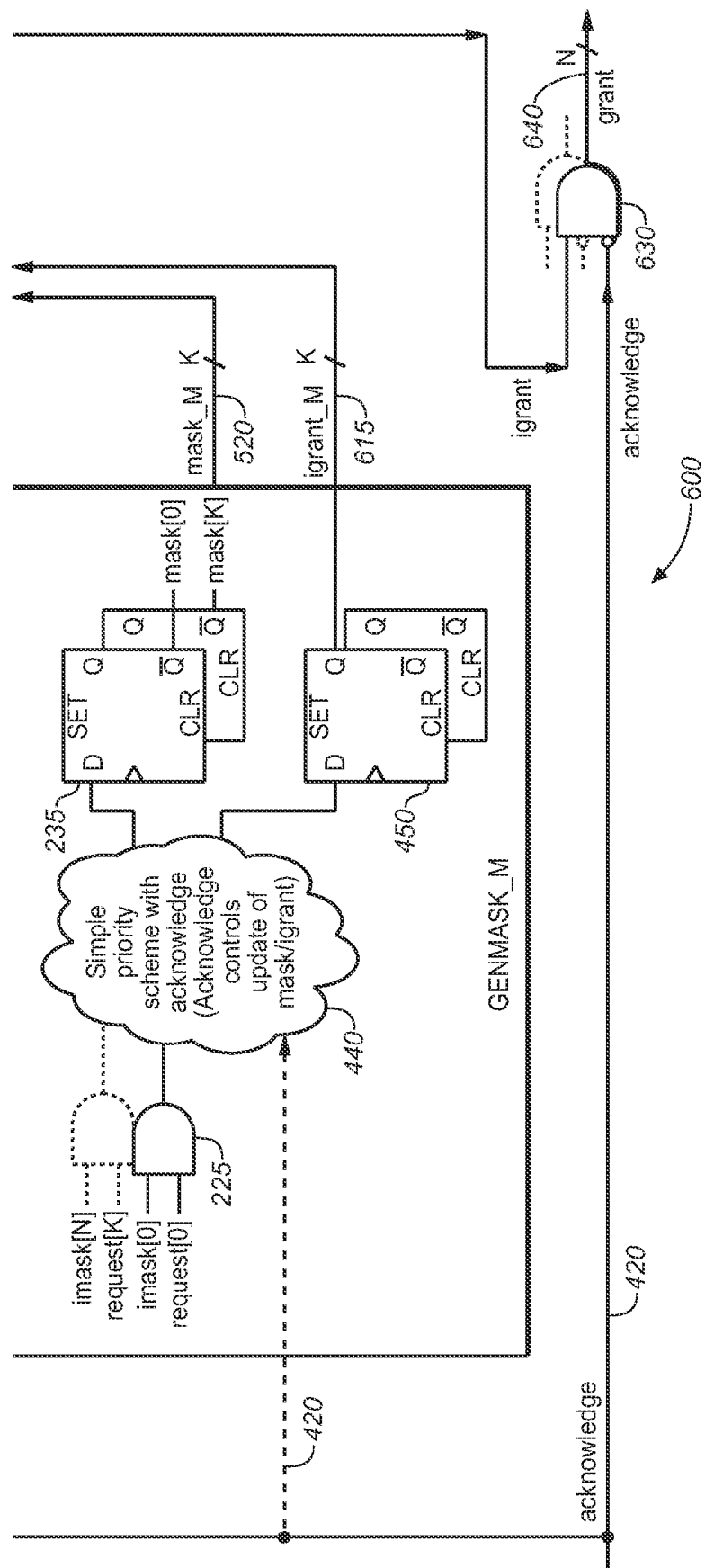
FIG. 6 is a block diagram illustrating signal processing circuitry for performing priority arbitration for a plurality of requestor slices with an acknowledge signal.

A circuit diagram representing an architecture 600 for performing priority arbitration for a plurality of requestor slices with an acknowledge signal is shown in FIG. 6. For example, the acknowledge signal 420 of FIG. 4 may be implemented in a plurality of requestor slices 505 of FIG. 5. In order to provide timing closure for architecture 600, a plurality of mask generation modules 605 (ex—mask generation module 430) may operate on a subset of the requestors, and an additional priority arbiter module 610 arbitrates between the output of the plurality of mask generation modules 605. For example, N requestors of a shared resource may be divided into M slices each operating K requestors.

Architecture 600 may include a mask reset module 201 for setting a temporary mask signal 203. Mask reset module 201 may include a plurality of AND gates 210. Plurality of AND gates 210 may include a single AND gate for each of the plurality of requestors. For example, if there are N requestors, than plurality of AND gates 210 may include N AND gates. Each of plurality of AND gates 210 may perform a bitwise AND operation on the mask signal 204 and a request signal 205. Mask signal 204 and request signal 205 may include a single bit for each of the plurality of requestors. Request signal 205 may represent a signal issued by each of plurality of requestors (ex—set to logic 1 if access to the shared resource is requested, set to logic 0 if access is not requested). For example, if there are N requestors, than mask signal 204 and request signal 205 may each be N-bit signals. The output of plurality of AND gates 210 may represent the requestors of the plurality of requestors included in the current priority assignment period via the mask signal 204 with a current request.

Mask reset module 201 may further include an OR gate 215 for performing a bitwise OR operation. OR gate 215 may accept the output of plurality of AND gates 210 as input signals. OR gate 215 may include a single input for each of plurality of AND gates 210. For example, if there are N AND gates, then OR gates 215 may include N inputs. The output of OR gate 215 may represent whether there are any requestors of the plurality of requestors included in the current priority assignment period with a current request.

Architecture 600 may further include multiplexer 220. Multiplexer 220 may be configured to select from two N-bit inputs to provide a temporary mask signal 203. A first input of multiplexer 220 may be communicatively coupled to mask reset signal 221. A second input of multiplexer 220 may be communicatively coupled to the output of plurality of AND gates 210. A control signal input of multiplexer 220 may be communicatively coupled to the output of OR gate 215. Multiplexer 220 may be configured to select and provide the mask reset value 221 as a temporary mask signal 203 if the control signal input of multiplexer 220 is a logic 0. Multiplexer 220 may be configured to select and provide the output of plurality of AND gates 210 as a temporary mask signal 203 if the control signal input of multiplexer 220 is a logic 1.

Architecture 600 may further include a plurality of mask generation modules 605 (ex—mask generation module 430). For example, if N requestors of a shared resource may be divided into M slices each operating K requestors, then plurality of mask generation modules may include M mask generation modules. Each of mask generation modules 605 may include plurality of AND gates 225. Plurality of AND gates 225 may include a single AND gate for each of the plurality of requestors handled by that mask generation module. For example, if there are K requestors, then plurality of AND gates 225 may include K AND gates. Plurality of AND gates 225 may perform a bitwise AND operation on the request signal 205 and temporary mask signal 203.

Each of plurality of mask generation modules 605 may further include priority scheme module 440. Priority scheme module 440 may receive the output of plurality of AND gates 225 and acknowledge signal 420 as input. Priority scheme module 440 may issue a slice access grant temporary signal 615. Slice access grant temporary signal 615 remains unchanged while acknowledge signal 420 is asserted (ex—set to logic 1). Each of mask generation modules 605 may further include a plurality of flip-flops 450 communicatively coupled to priority scheme module 440 for receiving and storing slice access grant temporary signal 615. Plurality of flip-flops 450 may include a single flip-flop for each of the bits of slice access grant temporary signal 615. Plurality of flip-flops 450 may include a clock signal for triggering the output of slice access grant temporary signal 615 to priority arbiter 610. For example, the slice access grant temporary signal 615 may include a one-hot encoded signal indicating access for one of the plurality of requestors. The one-hot encoded signal may include a single bit for each of the plurality of requestors. For example, if there are K requestors, then the one-hot encoded signal may include a K-bit signal. In another example, the slice access grant temporary signal 615 may include other signal encodings.

Each priority scheme module 440 may issue slice mask signal 520 to a plurality of flip-flops 235 for temporarily storing slice mask signal 520 for the next clock cycle. Plurality of flip-flops 235 may receive a clock signal as input for triggering the output of slice mask signal 520 to priority arbiter 610. For example, for K requestors, slice mask signal 520 may be represented by MASK. MASK may be a K-bit signal with bit MASK[0] through bit MASK[K−1]. Bit MASK[i] may represent the requestor granted access during the current priority assignment period.

In one example of a mask generation, bits MASK[0] through MASK[i] may be set to a logic 0 for the next priority assignment period. The bits representing the next requestors (ex—the requestors of the K-bit request signal with a greater bit location than the requestor granted access during the current priority assignment period) may be set to a logic 1 in the mask signal for the next priority assignment period. Using the previous example, bits MASK[i+1] through MASK[K-1] may be set to a logic 1 for the next priority assignment period.

Each of mask generation modules 605 may issue a slice mask signal 520 and a slice access grant temporary signal 615 to priority arbiter module 610. Priority arbiter module 610 may perform priority arbitration on each slice mask signal 520 and each slice access grant temporary signal 615 to provide a mask signal 204 and an access grant temporary signal 620. Mask signal 204 may be provided to mask reset module 201 for the next clock cycle.

Architecture 600 may further include plurality of AND gates with an inverted input 630. Plurality of NAND gates 630 may perform a bitwise NAND operation on access grant temporary signal 620 and the acknowledge signal 420 to provide access grant signal 640. Plurality of AND gates 630 may provide a non-zero access grant signal 640 when acknowledge signal 420 is not asserted (ex—set to logic 0). Priority scheme module 440 may also be configured to maintain a current mask signal 204 while acknowledge signal 420 is asserted. Thus, when acknowledge signal 420 is not asserted, mask signal 204 will be updated in the next clock cycle.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a Compact Disc (CD), a Digital Video Disk (DVD), a digital tape, a computer memory, conventional floppy disk, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A circuit for performing round robin arbitration for a plurality of requestors, comprising:
 a mask reset subcircuit including:
  N AND gates, each AND gate of the N AND gates associated with one of the N requestors, each AND gate of the N AND gates including:
   a first input communicatively coupled to receive a mask signal, and
   a second input communicatively coupled to a request line of one of the N requestors;
  a N-input OR gate, each input of the OR gate communicatively coupled to an output of one of the N AND gates of the mask reset subcircuit; and
  a multiplexer for selecting from at least two N-bit inputs to provide a selected output, the selected output including a single bit for each of the N requestors, the multiplexer including:
   a first multiplexer input, each bit of the first multiplexer input communicatively coupled to an output of the N AND gates of the mask reset subcircuit,
   a second multiplexer input communicatively coupled to a reset signal, and
   a control input communicatively coupled to the OR output; and
 a mask generation subcircuit including;
  N AND gates, each AND gate of the N AND gates associated with one of the N requestors, each AND gate of the N AND gates including:
   a first input communicatively coupled to a single bit of the selected output, and
   a second input communicatively coupled to a request line of one of the N requestors;
  a priority arbiter subcircuit for providing a grant signal assigning priority to one of the N requestors and the mask signal, the priority arbiter subcircuit coupled to receive an output of the N AND gates of the mask generation sub circuit as an input; and
  flip-flops communicatively coupled to the priority arbiter subcircuit for storing the mask signal to provide to the first input, the N flip-flops including a single flip-flop for each of N requestors, each flip-flop included in the N flip-flops including a flip-flop output.

2. The circuit of claim 1, wherein the reset signal is a N-bit signal and each bit of the reset signal is set to a logic 1.

3. The circuit of claim 1, the mask generation subcircuit further comprising:
  a plurality of flip-flops communicatively coupled to the priority arbiter subcircuit for storing a temporary grant signal, the plurality of flip-flops including a single flip-flop for each bit of the temporary grant signal, each flip-flop included in the plurality of flip-flops including a flip-flop output;
  a plurality of AND gates with an inverting input, each AND gate of the plurality of AND gates associated with a single bit of the grant signal, each AND gate of the plurality of AND gates including:
  a first input communicatively coupled to a single flip-flop output of the plurality of flip-flops, and
  the inverting input communicatively coupled to an acknowledge signal; wherein the priority arbiter subcircuit provides the grant signal via providing the temporary grant signal to the plurality of flip-flops, the priority arbiter subcircuit further receiving the acknowledge signal as input.

4. The circuit of claim 3, wherein the priority arbiter subcircuit is configured to maintain the mask signal while the acknowledge signal is asserted.

5. The circuit of claim 4, wherein the acknowledge signal is asserted when set to a logic 1.

6. The circuit of claim 3, wherein the priority arbiter subcircuit is configured to update the mask signal in the next clock cycle after the acknowledge signal is not asserted.

7. The circuit of claim 6, wherein the acknowledge signal is not asserted when set to a logic 0.

8. A circuit for performing round robin arbitration for a plurality of requestors, comprising:
  a mask reset subcircuit including;
    N AND gates, each AND gate of the N AND gates associated with one of the N requestors, each AND gate of the N AND gates including:
      a first input communicatively coupled to receive a mask signal, and
      a second input communicatively coupled to a request line of one of the N requestors;
    a N-input OR gate, each input of the OR gate communicatively coupled to an output of an output of one of the N AND gates of the mask reset subcircuit; and
    a multiplexer for selecting from at least two N-bit inputs to provide a selected output, the selected output including a single bit for each of the N requestors, the multiplexer including:
      a first multiplexer input, each bit of the first multiplexer input communicatively coupled to an output of the N AND gates of the mask reset subcircuit,
      a second multiplexer input communicatively coupled to a reset signal, and
      a control input communicatively coupled to the OR output;
  a plurality of mask generation subcircuits, each of the plurality of mask generation subcircuits including:
    N AND gates, each AND gate of the N AND gates associated with one of the N requestors, each AND gate of the N AND gates including:
      a first input communicatively coupled to a single bit of the selected output, and
      a second input communicatively coupled to a request line of one of the N requestors;
    a priority arbiter subcircuit for providing a slice grant signal assigning priority to one of the N requestors and the slice mask signal, the priority arbiter subcircuit coupled to receive an output of the N AND gates of the mask generation subcircuit as an input; and
    N flip-flops communicatively coupled to the priority arbiter subcircuit for storing the slice mask signal, the N flip-flops including a single flip-flop for each of N requestors, each flip-flop included in the N flip-flops including a flip-flop output; and
  a mask generation subcircuit arbiter for providing both:
    a grant signal assigning priority to one of the plurality of requestors based on the slice grant signal from each of the plurality of mask generation subcircuits, and a mask signal to the mask reset subcircuit based on a slice mask signal from each of the plurality of mask generation subcircuits.

9. The circuit of claim 8, wherein the reset signal is a N-bit signal and each bit of the reset signal is set to a logic 1.

10. The circuit of claim 8, each of the plurality of mask generation subcircuits further comprising:
  a plurality of flip-flops communicatively coupled to the priority arbiter subcircuit for storing a temporary slice grant signal, the plurality of flip-flops including a signal flip-flop for each bit of the temporary slice grant signal, each flip-flop included in the plurality of flip-flops including a flop-output;
  wherein the priority arbiter subcircuit provides the slice grant signal via providing the temporary slice grant signal to the plurality of flip-flops, the priority arbiter subcircuit further receiving an acknowledge signal as input.

11. The circuit of claim 10, further comprising:
  a plurality of AND gates with an inverting input, each AND gate of the plurality of AND gates including:
  a first input communicatively coupled to a single bit of the grant signal, and
  the inverting input communicatively coupled to the acknowledge signal,
  wherein the plurality of AND gates is configured to cancel the grant signal if the acknowledge signal is asserted.

12. The circuit of claim 10, wherein each priority arbiter subcircuit is configured to maintain the slice mask signal while the acknowledge signal is asserted.

13. The circuit of claim 12, wherein the acknowledge signal is asserted when set to a logic 1.

14. A circuit for performing round robin arbitration for a plurality of requestors, comprising:
  a mask reset subcircuit including:
    N AND gates, each AND gate of the N AND gates associated with one of the N requestors, each AND gate of the N AND gates including:
      a first input communicatively coupled to receive a mask signal, and
      a second input communicatively coupled to a request line of one of the N requestors;
    a N-input OR gate, each input of the OR gate communicatively coupled to an output of one of the N AND gates of the mask reset subcircuit; and
    a multiplexer for selecting from at least two N-bit inputs to provide a selected output, the selected output including a single bit for each of the N requestors, the multiplexer including:
      a first multiplexer input, each bit of the first multiplexer input communicatively coupled to an output of the N AND gates of the mask reset subcircuit;
      a second multiplexer input communicatively coupled to a reset signal; and
      a control input communicatively coupled to the OR output.

15. The circuit of claim 14, further comprising:

N AND gates, each AND gate of the N AND gates associated with one of the N requestors, each AND gate of the N AND gates including:

a first input communicatively coupled to a single bit of the selected output, and a second input communicatively coupled to a request line of one of the N requestors.

16. The circuit of claim 15, further comprising:

a priority arbiter subcircuit for providing a grant signal assigning priority to one of the N requestors and the mask signal, the priority arbiter subcircuit coupled to receive an output of the N AND gates of the mask generation subcircuit as an input.

17. The circuit of claim 16, further comprising:

N flip-flops communicatively coupled to the priority arbiter subcircuit for storing the mask signal to provide to the first input, the N flip-flops including a single flip-flop for each of N requestors, each flip-flop included in the N flip-flops including a flip-flop output.

\* \* \* \* \*